Jan. 8, 1963    C. P. DE BIASI    3,072,290
SPREADER AND HOPPER ASSEMBLIES WITH LUMP ELIMINATOR
Filed May 26, 1959    5 Sheets-Sheet 1
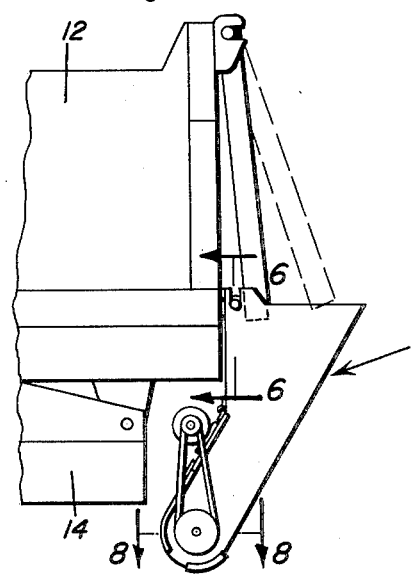
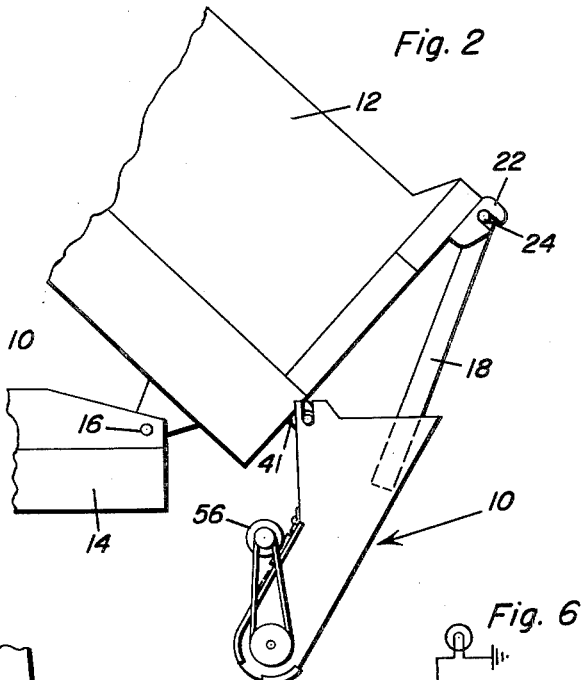
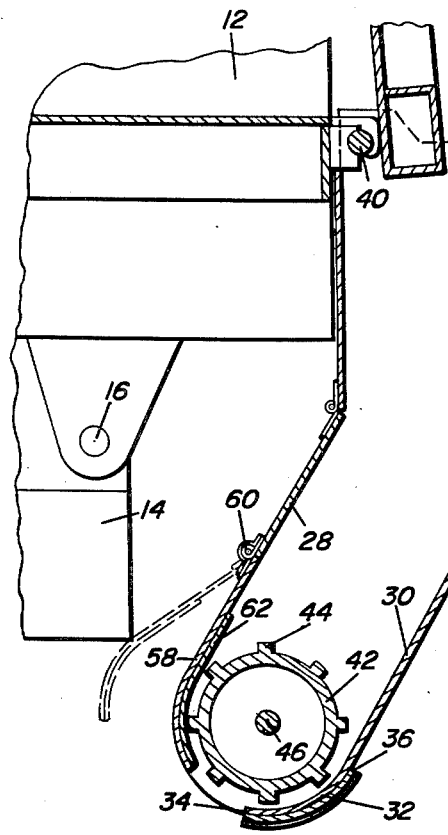
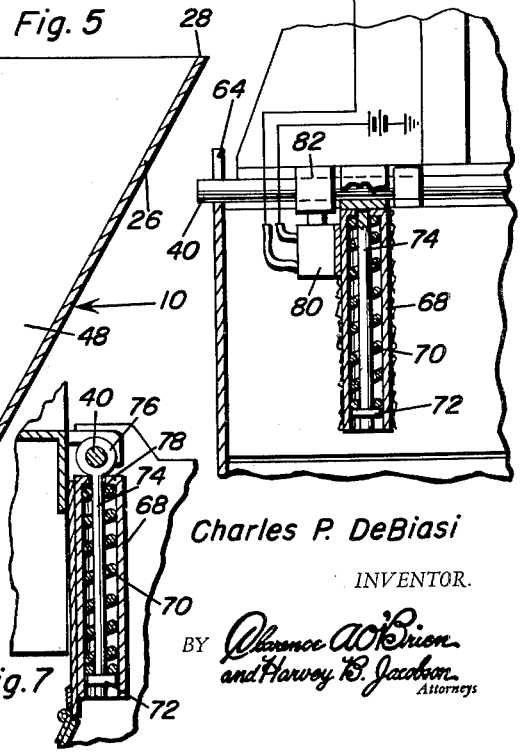
Charles P. DeBiasi
INVENTOR.

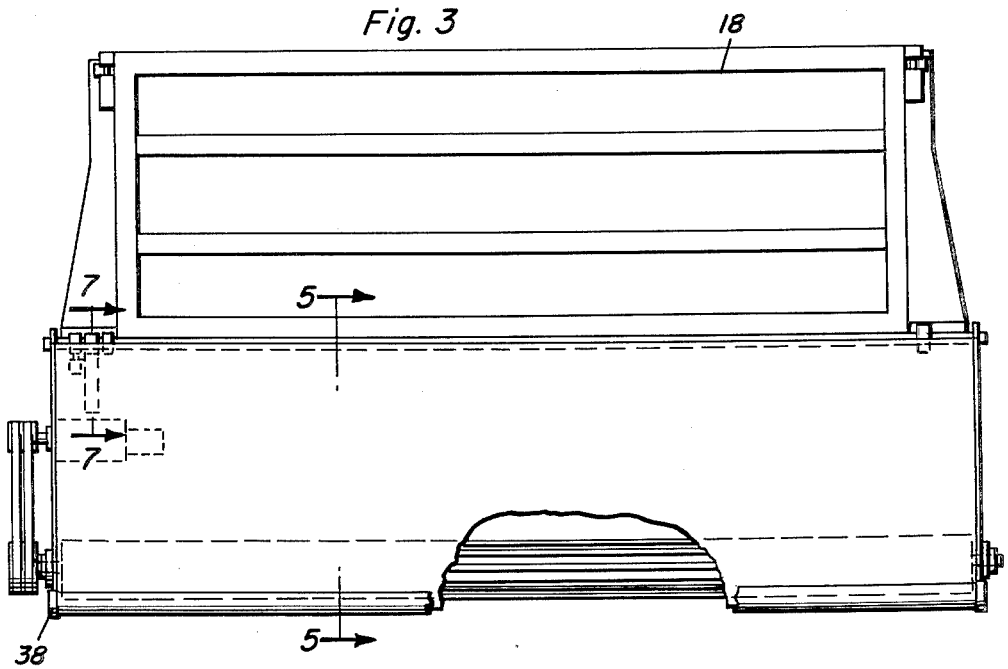
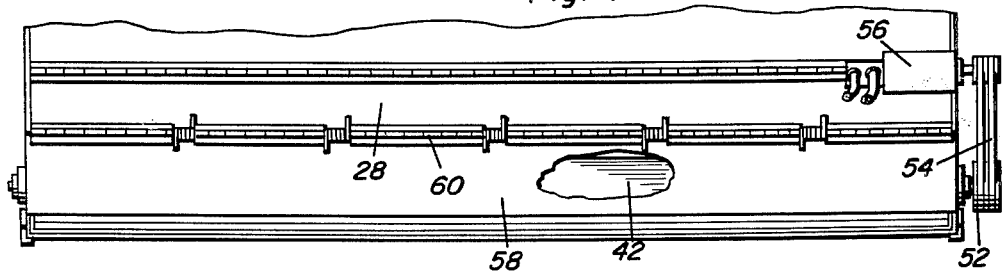
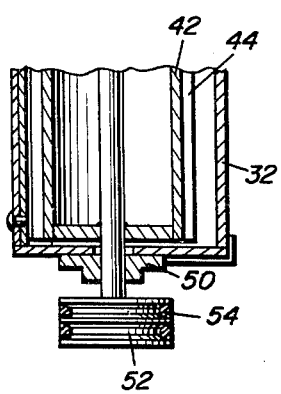
Charles P. DeBiasi
INVENTOR.

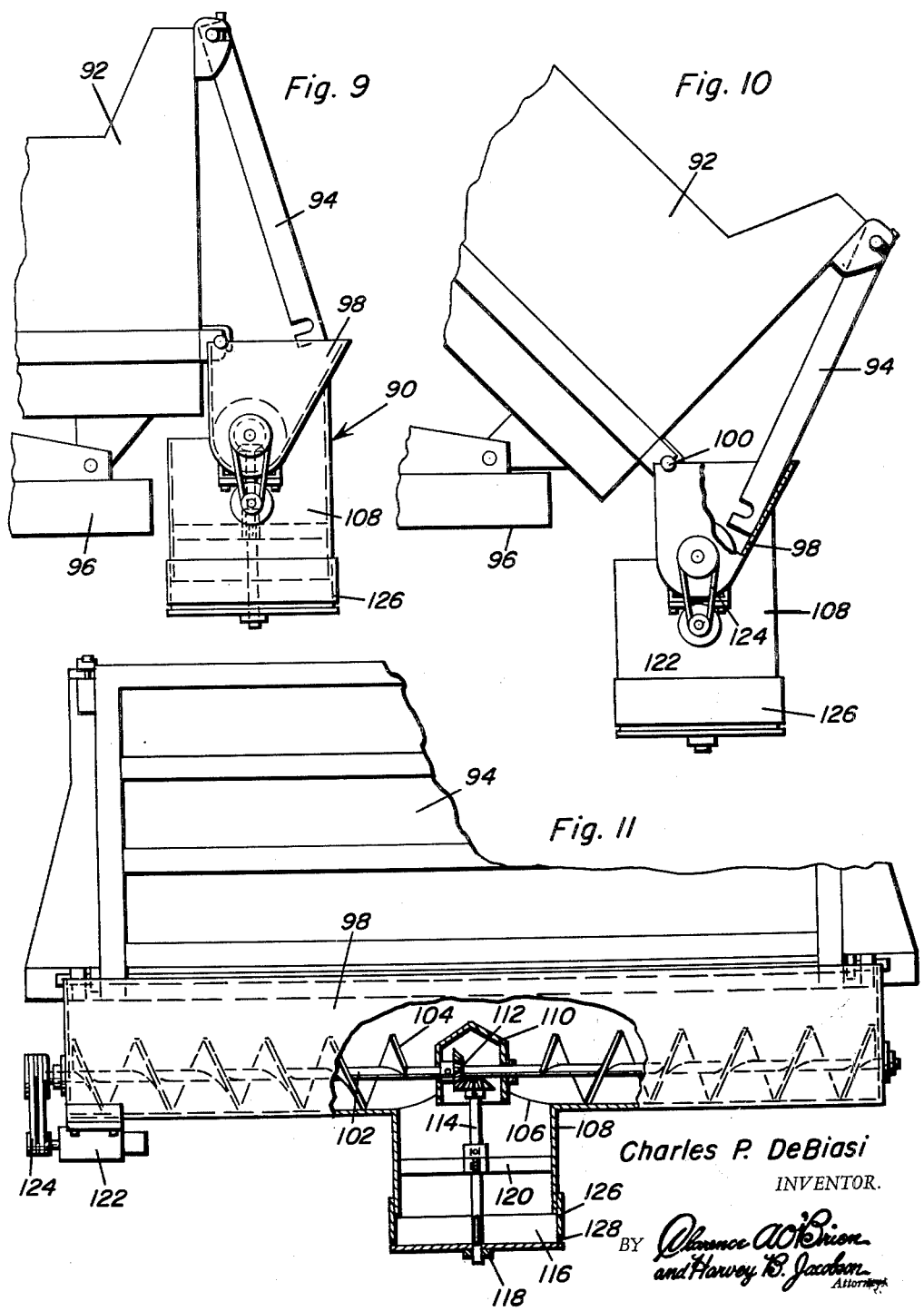

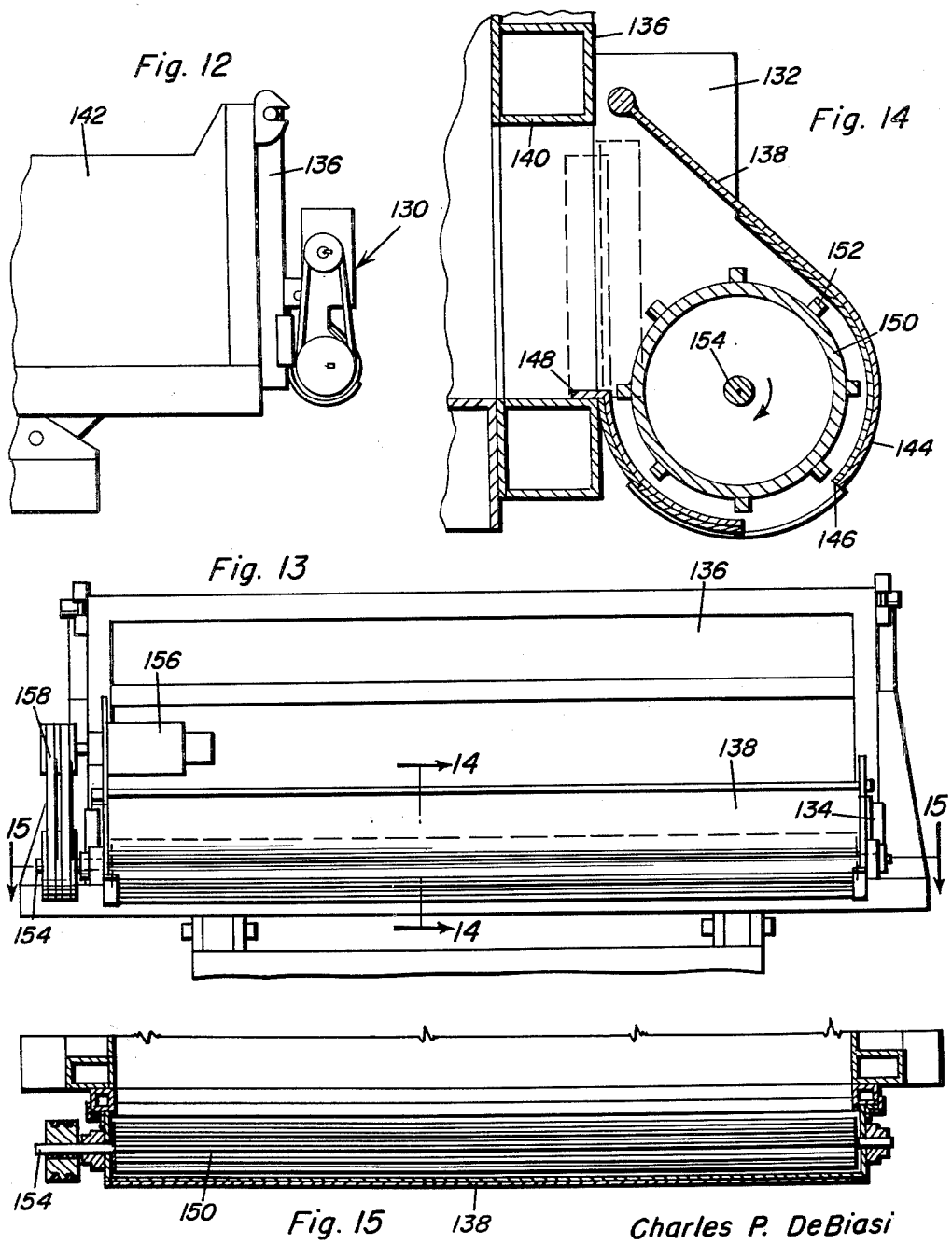

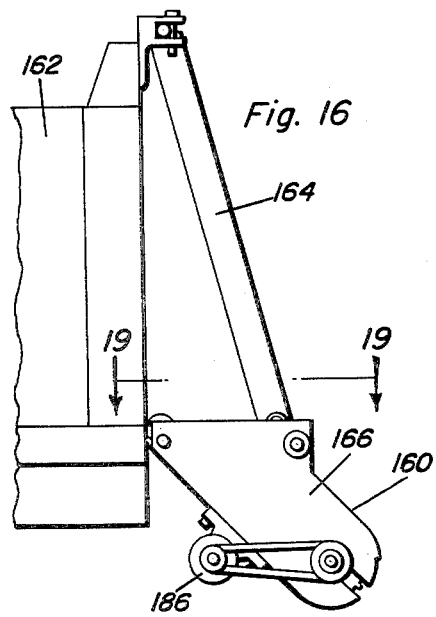
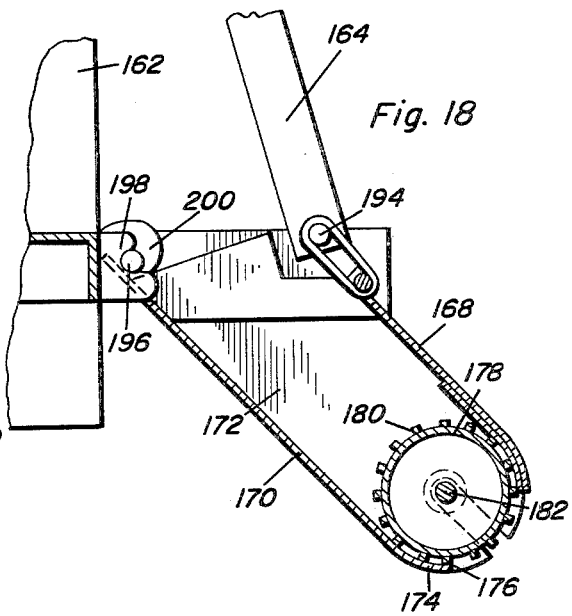
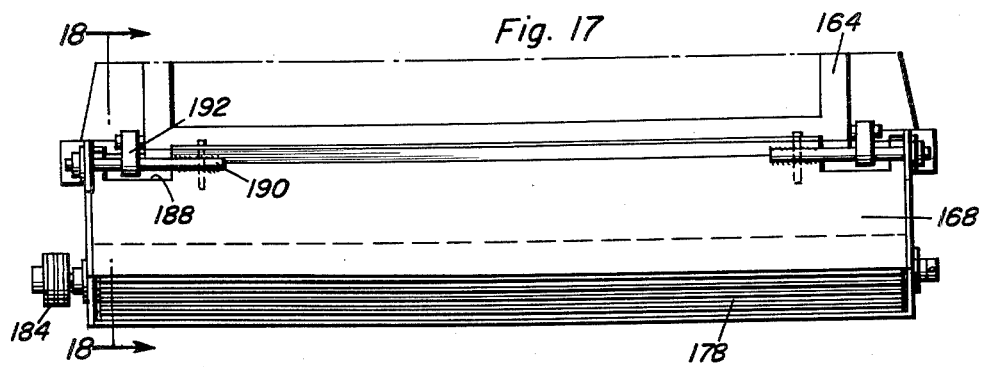
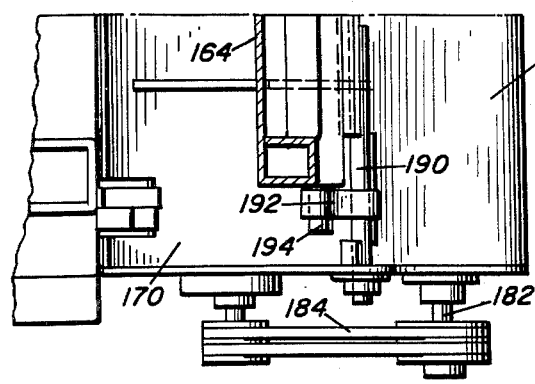
Charles P. DeBiasi
INVENTOR.

United States Patent Office 3,072,290
Patented Jan. 8, 1963

3,072,290
SPREADER AND HOPPER ASSEMBLIES WITH LUMP ELIMINATOR
Charles P. de Biasi, 74 Braman Road, Waterford, Conn.
Filed May 26, 1959, Ser. No. 815,970
11 Claims. (Cl. 222—23)

The present invention generally relates to a material spreader and more particularly to such a spreader specifically adapted for attachment to the rear or discharge end of a dumpable body for receiving material therefrom and discharging the same onto a surface being traversed by the vehicle.

The primary object of the present invention is to provide a material spreader generally including a hopper for receiving material from a body of a vehicle such as a dumpable body with the hopper including a discharge device for spreading material over the path being traversed by the vehicle and is primarily adapted for use in spreading sand, fine gravel, salt or the like such as is employed on snow and ice covered streets, roads or the like.

Another object of the present invention is to provide a material spreader incorporating into its construction an arrangement whereby lumps will be passed through the discharge device by virtue of a spring biased or gravity biased movable shield which will move out of the way to permit a lump to be discharged and then moved back to a normal position.

Yet another important feature of the present invention is to provide a material spreader in accordance with the immediately preceding objects in which the hopper is provided with a signal actuator that signals to the operator of the vehicle that the hopper is empty thus indicating that the dumpable body should be tilted for once again filling up the hopper which enables the driver to stop and refill the hopper.

A still further object of the present invention is to provide a material spreader having a centrally disposed broadcast spreader together with conveying means extending laterally to both sides and receiving material from the body of the vehicle so that the material will be moved inwardly for discharge through the central broadcast device.

Another object of the present invention is to provide a material spreader which is extremely simple in construction, easy to attach and detach, efficient for its particular purposes and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the rear portion of a dump body of the vehicle illustrating the spreader of the present invention supported therefrom;

FIGURE 2 is a side elevation of the construction of FIGURE 1 illustrating the orientation of the components when the dumpable body is moved to a dumping position;

FIGURE 3 is a rear elevation of the construction of FIGURE 1 with a portion of the hopper being broken away for illustrating the details of construction;

FIGURE 4 is a front elevational view of the hopper with portions broken away;

FIGURE 5 is a vertical sectional view taken substantially upon a plane passing along section line 5—5 of FIGURE 3 illustrating the details of construction of the hopper;

FIGURE 6 is a detailed sectional view taken substantially upon a plane passing along section line 6—6 of FIGURE 1 illustrating the signal actuating mechanism;

FIGURE 7 is a detailed sectional view taken substantially upon a plane passing along section line 7—7 of FIGURE 3 illustrating further structural details of the signal actuating device;

FIGURE 8 is a detailed sectional view taken substantially upon a plane passing along section line 8—8 of FIGURE 1 illustrating the details of construction of the spreader;

FIGURE 9 is a side elevational view illustrating a modified form of the invention employing a central broadcasting device and conveying means for conveying the material into the broadcast device;

FIGURE 10 is a side elevation of the construction of FIGURE 9 but illustrating the dump body in dumping position with portions of the hopper being broken away;

FIGURE 11 is a partial rear elevation of the construction of FIGURE 9 with portions of the housing being broken away for illustrating the details of construction thereof;

FIGURE 12 is a side elevation of another modified form of the invention;

FIGURE 13 is a rear elevation of the construction of FIGURE 12;

FIGURE 14 is a transverse, vertical sectional view taken substantially upon a plane passing along section line 14—14 of FIGURE 13 illustrating the structural details of this form of the invention;

FIGURE 15 is a longitudinal, plan sectional view taken substantially upon a plane passing along section line 15—15 of FIGURE 13 illustrating further structural details of this form of the invention;

FIGURE 16 is a side elevation of another form of spreader attached to the rear of a load carrying body;

FIGURE 17 is a rear elevation of the construction of FIGURE 16;

FIGURE 18 is a transverse, sectional view taken substantially upon a plane passing along section line 18—18 of FIGURE 17 illustrating further structural details of this form of the invention; and FIGURE 19 is a plan view with the tailgate being shown in section and illustrating the structural relationship of the components of the form of the invention illustrated in FIGURE 16, with the reference line of FIGURE 19 being designated by 19—19 on FIGURE 16.

Referring now specifically to the drawings, the numeral 10 generally designates the spreader of the present invention which is adapted for mounting rearwardly of a dump vehicle having a dump body 12 pivotally attached to a mobile frame 14 by the usual hinge pin 16. The body 12 is also provided with a tailgate 18 hingedly attached at its upper end to brackets 22 by virtue of mounting pins 24.

The spreader 10 includes a hollow hopper 26 having an open top 28 and generally parallel lower wall portons 28 and 30 which are rounded into a generally cylindrical wall portion 32 at the lower edge thereof which has a transverse slot-like opening 34 closable by virtue of a movable arcuate plate 36. The plate 36 is supported by end flanges 38 whereby the size of the opening 34 may be controlled or the opening may be completely closed off.

The upper end of the hopper 26 is supported on a transverse rod 40 carried by brackets 41 rigid with the body 12.

Supported in the cylindrical portion 32 is a rotating cylindrical drum 42 having a plurality of fin-like projections 44 extending longitudinally thereon. The drum 42 is supported on a shaft 46 which extends outwardly beyond the end walls 48 and is supported in bearings 50 with one end of the shaft having a double V-belt pulley 52 thereon for driving engagement by a pair of V-belts 54 which in turn are driven by a motor 56 supported on the wall portion 28.

As the drum 42 is rotated by the motor 56, material such as sand or the like will be caused to discharge through the opening 34. In the event a lump is disposed within the hopper, the lower portion of wall member 28 is swingable outwardly with the lower portion being designated by the numeral 58 and connected to the main portion of the wall 28 by a spring biased hinge 60. The inner surface of the movable wall portion 58 may be covered with a cushioning material 62 upon which the lumps will engage when the wall portion 58 is pivoted upwardly.

The end walls 48 are provided with notches 64 receiving the ends of the rod 40 and the wall portion in opposition to the wall 26 is provided with a tubular sleeve 68 rigidly affixed thereto which has a compression coil spring 70 therein that has one end engaging an abutment 72 on an elongated eye bolt 74 which has an upper eye or sleeve 76 engaged with and on the rod 40. The upper end of the spring 50 engages the inturned flanged end 78 on the tubular member 68. Thus, when the hopper is full of material, the spring 70 will be compressed thus allowing downward movement of the hopper until the hopper is disposed with the rod 40 adjacent the upper end of the notch 64. Mounted on the side wall of the casing 68 is a microswitch 80 adapted to engage a sleeve 82 mounted on the rod 40 so that when the hopper is loaded and the spring 70 is compressed, the microswitch 80 will be in an open position indicating to the driver of the vehicle the normal operation of the spreader. However, when the hopper 26 becomes empty or substantially empty, the spring 70 will expand back to its normal position thus bringing the microswitch 80 into engagement with the sleeve 82 thereby actuating a signal device which indicates to the operator of the vehicle that the hopper is or is approaching an empty condition and must be refilled.

In operation of the device, the attachment to the dump body is made in an obvious manner and the tailgate 18 may swing from the position illustrated in FIGURE 1 to the position illustrated in FIGURE 2. Since the hopper is relatively enlarged, a relatively large quantity of material may be disposed therein. Thus, the signal actuating switch 80 is employed to indicate to the driver that the material in the hopper is approaching the diminishing stage thereby indicating that the hopper should be refilled at the earliest opportunity.

The tailgate 18 of course is freely pivotal and will allow material to be discharged from the vehicle body directly into the hopper for discharge on the road surface or the like.

FIGURES 9-11 illustrate a modified form of the invention generally designated by the numeral 90 which is also mounted in the same orientation in relation to the vehicle body 92, the tailgate 94 and the frame 96. The tailgate hopper 98 is supported from the usual pins 100 which engage and retain the lower end of the tailgate 94.

The hopper 98 is provided with a rounded lower edge portion and receives therein a right and a left hand partial screw auger conveyor including a shaft 102 and two segments of flights 104 each of which has a pitch for discharging material laterally inwardly for discharge through an enlarged opening 106 into a depending cylindrical housing 108. The housing 108 is provided with an upwardly extending inverted hollow housing 110 housing a pair of miter gears 112 which connects the shaft 102 with a vertical shaft 114 which has a broadcasting radial vane blade 116 detachably connected to the lower end by a fastening nut 118. The central housing 110 which receives the gears 112 also protects the gears 112 from contamination with material and the shaft 114 is supported by a centralizing spider 120 thereon which supports and journals the shaft 114. The shaft 102 is provided with the usual drive motor 122, drive pulleys 124 with the input shaft being contiguous with the shaft 102.

The rotating fin plate 116 is provided with a lateral opening which is partially closed by a sliding control sleeve 126 which controls the heights of peripheral slots 128 provided for discharging material from the spreader and broadcasting the same laterally in a predetermined pattern.

FIGURES 12-15 illustrate another form of the invention generally designated by the numeral 130 which includes a pair of end walls 132 having outturned flanges for engagement with brackets 134 carried by the tailgate 136 so that the hopper 138 will be in alignment with an opening 140 in the tailgate 136 which is also supported from the vehicle body 142 and may actually be a spare tailgate. The hopper 138 is provided with a cylindrical portion 144 having a discharge opening 146 therein and a sliding closure plate therefor together with a flange 148 at the entrance end thereof engaging the bottom edge of the opening 140 whereby material will be discharged directly into the hopper 138 whereby a drum 150 having radial fins 152 thereon will agitate the material and be rotatable about a shaft 154 which is driven from motor 156 by a V-belt drive 158.

Referring now specifically to FIGURES 16-19 of the drawings, the numeral 160 generally designates another form of the invention that is supported from the vehicle body 162 having a tailgate 164 attached at its upper edge to the vehicle body 162. In this form of the invention, the spreader includes a hopper 166 having outwardly inclined and parallel walls 168 and 170 and also end walls 172. The outer end of the walls 168 and 170 curves into a cylindrical portion 174 having an exit opening 176 therein which also provides a discharge for material that is moved to and through the opening 176 by drum 178 having fins or projections 180 thereon which are mounted on an adjustable shaft 182 driven by a V-belt arrangement 184 and a motor 186 all as clearly shown in the drawings.

The upper edge of the wall 168 is provided with a notch 188 and a transverse rod 190 extending therethrough. The rod 190 is provided with a loop 192 attached thereto which loop fits over the projecting pin 194 normally provided at the outer end of the tailgate 164. The other wall 170 is provided with a rod 196 extending between the end walls for reception in the usual brackets 198 provided on the bottom 162 and is held in position by the usual hold down elements 200 that normally receive the pins 194.

In each form of the invention, the loading switch mechanism may be incorporated as is the lump eliminator. Also, the device could be attached to various devices such as a transit mixer or the like with the several forms of the invention incorporating novel means for attachment to the vehicle body and novel means for discharging material and eliminating lumps therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a dumpable load carrying body having a pivotal closure gate at the rear thereof for normally closing the open rear end of the body, said gate having projecting pins on each end thereof extending outwardly from the side edges, said body having a latch means adjacent the bottom edge of the rear open end for normally receiving the pins and holding the gate in closed position, a transversely extending hopper having an open end, means on the forward edge of the open end of said hopper for engagement by said latch means, means on the rear edge of the open end of said hopper for engagement with the pins on the closure gate for maintaining the closure gate in open position and supporting the hopper from the body and gate, said hopper having a cylindrical lower portion with a longitudinally extending arcuate slot therein, a drum rotatable in the cylindrical portion of the hopper, said drum having a plurality of fins for movement closely adjacent the inside surface of the hopper for discharging material through the discharge slot, and means connected with the drum for rotatably driving the drum for discharging material through the slot whereby the hopper may be supported from the dumpable body without modification of the dumpable body.

2. The combination as defined in claim 1 wherein a movable arcuate closure plate is mounted on the external surface of the hopper for selectively closing the discharge slot for controlling the flow of material therethrough.

3. The combination as defined in claim 1 wherein said means at the rear edge of the open end of the hopper includes a pair of loop shaped elements having one end thereof engaged with the pins on the closure gate, said hopper including a pair of projecting rods paralleling said pins with the other end of the loops engaging said rods.

4. The combination as defined in claim 1 wherein said means at the forward edge of the open upper end of said hopper includes a partial transverse rod at each end portion of the hopper with a portion of the hopper wall adjacent each rod being omitted thereby defining notches whereby the hopper may be disposed in registry with the latch means with the notches enabling the transverse rods to be engaged with the latch means.

5. A material spreader for use in combination with a load carrying body having a transversely extending discharge opening, said spreader including a hopper supported from the body and having an open upper end communicating with the discharge opening in the body, said hopper including substantially a cylindrical lower portion having an arcuate discharge slot therein, a movable closure plate for selectively closing said slot, a rotatable drum disposed in the lower portion of the hopper and including radially extending fins for causing discharge of material through the slot, and spring biased means forming one edge of the slot in the cylindrical lower portion of the hopper for movement away from the drum when the radial fins encounter a lump thus enabling the lump to be discharged from the hopper, and means freely swingably supporting said hopper from said load carrying body for positioning the hopper in depending relation thereto whereby the arcuate discharge slot will be disposed substantially in the same relative position to the rotatable drum and hopper.

6. A material spreader for use in combination with a load carrying body having a transversely extending discharge opening, said spreader including a hopper supported from the body and having an open upper end communicating with the discharge opening in the body, said hopper including substantially a cylindrical lower portion having an arcuate discharge slot therein, a movable closure plate for selectively closing said slot, a rotatable drum disposed in the lower portion of the hopper and including radially extending fins for causing discharge of material through the slot, and spring biased means forming one edge of the slot in the cylindrical lower portion of the hopper for movement away from the drum when the radial fins encounter a lump thus enabling the lump to be discharged from the hopper, and means freely swingably supporting said hopper from said load carrying body for positioning the hopper in depending relation thereto whereby the arcuate discharge slot will be disposed substantially in the same relative position to the rotatable drum and hopper, said hopper supporting means including a calibrated spring whereby the hopper may move downwardly in relation to the body when filled with material and move upwardly in relation to the body when emptied, and a signal circuit switch having an actuating member disposed in the path of movement of a portion of the hopper whereby upward movement of the hopper which occurs when the hopper is empty will operate the actuating member thereby energizing a signal for warning the operator that the hopper is empty.

7. In a material dispensing assembly, a hopper, means carried by a lower portion of said hopper to discharge material therefrom, means movably supporting said hopper, said means including calibrated spring means whereby the hopper may move downwardly when filled with material and upwardly as the material is discharged, and a signal circuit switch having an actuating member engageable by said hopper whereby movement of said hopper will operate the actuating member thereby indicating the supply condition of material in the hopper, said hopper including a substantially cylindrical lower portion having an arcuate discharge slot therein, a movable closure plate for selectively closing said slot, a rotatable drum disposed in the lower portion of the hopper and including radially extending fins for causing discharge of maiterial through the slot, and spring biased means forming one edge of the slot in the cylindrical lower portion of the hopper for movement away from the drum when the radial fins encounter a lump thus enabling the lump to be discharged from the hopper.

8. The structure as defined in claim 7 wherein said calibrated spring means is freely swingably supported from a dumpable load carrying body for positioning in depending relation thereto regardless of the angular orientation of the load carrying body.

9. A material dispenser comprising a hopper having a substantially cylindrical lower portion with an arcuate discharge slot therein, an arcuate movable closure plate for selectively closing said slot, a rotatable agitator disposed in the lower portion of the hopper and including radially extending members for causing discharge of material through the slot, said lower portion of the hopper including spring biased means forming one edge of the slot for movement away from the agitator when the radial members encounter a lump thereby enabling the lump to be discharged from the hopper, and means movably supporting said hopper including a calibrated spring assembly whereby the hopper may move downwardly in tensioning the spring when filled with material and move upwardly when emptied, and a signal circuit switch having an actuating member engageable by the hopper whereby movement of the hopper would indicate the supply condition of material in the hopper.

10. A material spreader for use in combination with a load carrying body having a transversely extending discharge opening, said spreader including a hopper supported from the body and having an open upper end communicating with the discharge opening in the body, said hopper including substantially a cylindrical lower portion having a centrally located depending cylindrical discharge member, conveyor means disposed in the lower portion of the hopper for moving the material in the hopper inwardly toward the center for discharge, a rotatable plate disposed below and adjacent the cylindrical discharge member driving means interconnecting the center of the conveyor means and the rotatable plate whereby material dropped onto the plate will be broadcast laterally thereof, and means freely swingably supporting said hopper from said load carrying body for positioning the hopper in depending relation thereto, said hopper including a rear wall forming part of the open upper end and said body including a tailgate having the lower end portion thereof received in the open upper end of the hopper thereby employing the tailgate as an extension of the rear wall of the hopper thereby preventing material from being discharged from the body over top of the hopper.

11. In combination with a load carrying body having a tailgate with a transversely extending discharge opening therein, said spreader including a housing having a cylindrical portion with an arcuate discharge slot therein, a rotatable drum disposed in the cylindrical portion and including a plurality of radial fins for discharging material through the slot, a sliding plate for said slot thereby controlling the discharge of material therefrom, said housing including a horizontally projecting flange received in the bottom and side edge portions of the opening in the tailgate, said housing including end walls, said tailgate including brackets engaged by said end walls thereby rigidly supporting the hopper from the tailgate, one of said end walls including an area for supporting means for driving the drum whereby the entire tailgate and hopper assembly may be removed from or attached to the load carrying body.

References Cited in the file of this patent

UNITED STATES PATENTS

| | | |
|---|---|---|
| 1,285,183 | Holden | Nov. 19, 1918 |
| 1,489,739 | Chisholm | Apr. 8, 1924 |
| 1,724,876 | Holbeck | Aug. 13, 1929 |
| 1,736,124 | Meijer | Nov. 19, 1929 |
| 1,874,634 | Schaupp | Aug. 30, 1932 |
| 2,093,953 | Burchett | Sept. 21, 1937 |
| 2,421,211 | Lutz | May 27, 1947 |
| 2,526,191 | Barker | Oct. 17, 1950 |
| 2,538,886 | Skible et al. | Jan. 23, 1951 |
| 2,643,798 | Neff | June 30, 1953 |
| 2,723,053 | Gandrud | Nov. 8, 1955 |
| 2,779,507 | Rader | Jan. 29, 1957 |
| 2,874,880 | Schiebel | Feb. 24, 1959 |
| 2,893,740 | Gaddis | July 7, 1959 |
| 2,904,224 | Young | Sept. 15, 1959 |
| 2,967,056 | D'Amato | Jan. 3, 1961 |